United States Patent
Reed

(10) Patent No.: US 6,542,971 B1
(45) Date of Patent: Apr. 1, 2003

(54) MEMORY ACCESS SYSTEM AND METHOD EMPLOYING AN AUXILIARY BUFFER

(75) Inventor: David Gerard Reed, Saratoga, CA (US)

(73) Assignee: Nvidia Corporation, Santa Clara, CA (US)

(*) Notice: Subject to any disclaimer, the term of this patent is extended or adjusted under 35 U.S.C. 154(b) by 144 days.

(21) Appl. No.: 09/841,057

(22) Filed: Apr. 23, 2001

(51) Int. Cl.[7] .............................................. G06F 13/00
(52) U.S. Cl. ........................... 711/147; 710/52; 710/56; 710/57; 711/113
(58) Field of Search .............................. 710/52, 56, 57; 711/113, 147

(56) References Cited

U.S. PATENT DOCUMENTS

| | | | | |
|---|---|---|---|---|
| 4,115,854 A | * | 9/1978 | Capowski et al. | 710/52 |
| 6,219,745 B1 | * | 4/2001 | Strongin et al. | 711/100 |
| 6,324,599 B1 | * | 11/2001 | Zhou et al. | 710/26 |
| 6,412,030 B1 | * | 6/2002 | Adusumilli | 710/33 |

* cited by examiner

Primary Examiner—T. V. Nguyen
(74) Attorney, Agent, or Firm—Cooley Godward LLP

(57) ABSTRACT

A buffering system attached to a memory for holding write-once, read-once data that is accessed by one or more peripheral devices. Data that is otherwise destined to be written to main memory is written, instead, into a storage buffer. The buffer is written using an address contained in a write pointer that is updated according to a predetermined pattern after the write operation. After updating the write pointer, if the address equals the read pointer, some or all of the buffer is flushed to the memory. Data is read from the buffer using an address contained in a read pointer that is updated according to the same predetermined pattern after the read operation. Any deviation from the pattern in either writing or reading the buffer causes the some or all of the buffer to be flushed to main memory and the read pointer to be updated accordingly.

16 Claims, 7 Drawing Sheets

MEMORY ACCESS SYSTEM AND METHOD EMPLOYING AN AUXILIARY BUFFER

CROSS-REFERENCE TO RELATED APPLICATIONS

1. Field of the Invention

The present invention relates generally to memory controllers in a computing system and more particularly to a memory controller in a computing system having an auxiliary buffer for write-once/read-once data.

2. Description of the Related Art

FIG. 1 shows a current computing system hardware platform 10 which employs an architecture in which a main bridge 12 (acting as a central switch) connects the processing element or elements 14, peripheral device adapters (including an auxiliary bridge) 16–18 and graphics subsystem 20 to the main memory 22, which is the primary repository for data and instructions for the processing element 14, the peripherals 16–18 and the graphics subsystem 20. A local memory 24 for storing graphics data is typically connected to the graphics subsystem 20. The main bridge 12 handles a large amount of data traffic because virtually all of the data, which the processing element 14, the peripherals 16–18 and the graphics subsystem 20 need, must move through the main bridge 12 to and from the main memory 22. In particular, not only does the main bridge 12 allow the processing element(s) 14, the peripheral adapters 16–18 and the graphics interface to access main memory, but it also permits the processing element(s) 14, and the bus adapters 16–18 to access the local graphics memory 24.

A hardware platform embodying the architecture of FIG. 1 has been adequate for much of the computing that takes place on such a platform. However, the processing element, peripherals and graphics subsystem have each been improved. Faster processing elements now demand gigabytes per second from the main memory; peripheral systems transfer data at speeds of hundreds of megabytes per second; and graphics subsystems are capable of rendering more than 50 Million polygons (triangles) per second. The combined load, which might be as high as 3.0 Gigabytes per second, must be borne by the main memory system and the bus that connects that system to the main bridge. As might be expected, the main memory and main memory bus have proved to be a barrier to further increases in system performance for the above architecture.

As mentioned above, the graphics subsystem has played a significant role in the increasing traffic load to and from the main memory. In particular, if a graphics subsystem intends to render 50 Million triangles per second, wherein each new triangle is defined by a single vertex of 30 bytes, the load on the memory is approximately 1500 Megabytes per second to store the data in memory and 1500 Megabytes per second to retrieve the data from memory, for a total of 3 Gigabytes per second, just for the graphics system.

Even if the memory system has a wide bus, say 16 bytes, the memory system must produce at least 187.5 Million cycles per second to handle a data transfer of about 3 Gigabytes in one second. Currently, main memory systems designed for this type of platform cannot deliver this data transfer requirement and, as a result, each device that is connected to the main bridge suffers a larger latency and lower overall transfer rate.

Thus, there is a need to improve the performance of such systems having a main bridge without radically altering the architecture that is already in place for these systems. The need is particularly acute with respect to the graphics subsystems which will need even more bandwidth to handle 3D graphics applications.

BRIEF SUMMARY OF THE INVENTION

The present invention meets the above need. A method of accessing a memory with an auxiliary buffer, in accordance with the present invention, includes the following steps. First, a memory request having an address specifying a location in memory is received. The memory request has a type which is either 'read' or 'write', and the write request includes write data. Next, the address of the memory request is tested to determine whether it is within a predetermined range of addresses in the memory. If the request is in-range and if the request is a write request and the address in the write request matches the write pointer, then the buffer is written with the write data at the location specified in the write pointer and the write pointer is altered after writing the buffer to point to the next location for writing in the buffer. If the request is in range and the request is a read request and the address in the read request matches the read pointer, the buffer is read from the location specified in the read pointer and the read pointer is altered after reading the buffer to point to the next location for reading the buffer.

A buffering system for a memory that receives memory requests, the memory request having an address specifying a location in memory and a type being either a read or a write, a write request including write data, in accordance with the present invention, includes a decoder for determining whether the memory request is within a predetermined range of addresses in the memory based on the address of the request and generating an in-range indicator.

Further included is comparison circuitry for indicating when the address in the request matches either the read pointer or write pointer in response to the in-range indicator, for indicating when the address and the read pointer are equal, and for indicating when the address of a request is between the write pointer and read pointer.

An auxiliary buffer controller is included for performing read and write operations on the auxiliary buffer. The auxiliary buffer controller includes means for writing the buffer with the write data at the location specified in the write pointer and for reading the buffer from the location specified in the read pointer in response to a write-pointer match or a read pointer match, and means for making available some or all of the contents of the auxiliary buffer for writing to the memory in response to an indication that the address of a request is between the write pointer and read pointer, and in response to an indication that the address equals the read pointer after a buffer write operation.

Also included in the buffering system is pointer circuitry for updating the write pointer after writing the buffer to point to the next location for writing in the buffer in response to a write-pointer match, and for updating the read pointer after reading the buffer to point to the next location for reading the buffer in response to a read-pointer match.

Finally, an auxiliary buffer is included. The auxiliary buffer is connected to the memory and to auxiliary buffer controller means, for holding write-once, read-once data.

One advantage of the present invention is that data that is ordinarily written once to memory only to be read once thereafter need never be stored in main memory. This prevents the data from tying up the main memory bus twice, once when written and once when read, thereby freeing up the main memory bus for other memory data that is more useful to store in main memory.

Another advantage of the present invention is that peripheral subsystems, utilizing write-once, read-once data, are not required to change because the addition of the auxiliary buffer does not affect the operation of those subsystems, except to provide lower latency access to the data.

Yet another advantage of the present invention is that other parts of the computing platform are sped up because some or all of the write-once, read-once traffic is removed from the memory bus. This enables other peripherals to have access to the main memory when they would otherwise wait.

Yet another advantage is lower power consumption in the system because the external memory interface, whose I/O interface consumes appreciable power, and the internal circuitry of the memory devices connected to the external memory interface, are less active.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

The present invention requires that the hardware of the main bridge be modified in two areas. First, an auxiliary buffer is added to the memory controller of the main bridge. Second, an auxiliary buffer controller is added which includes an address decoder for determining when a request is made for the auxiliary buffer. Each of these modifications is described below.

Figure 1:
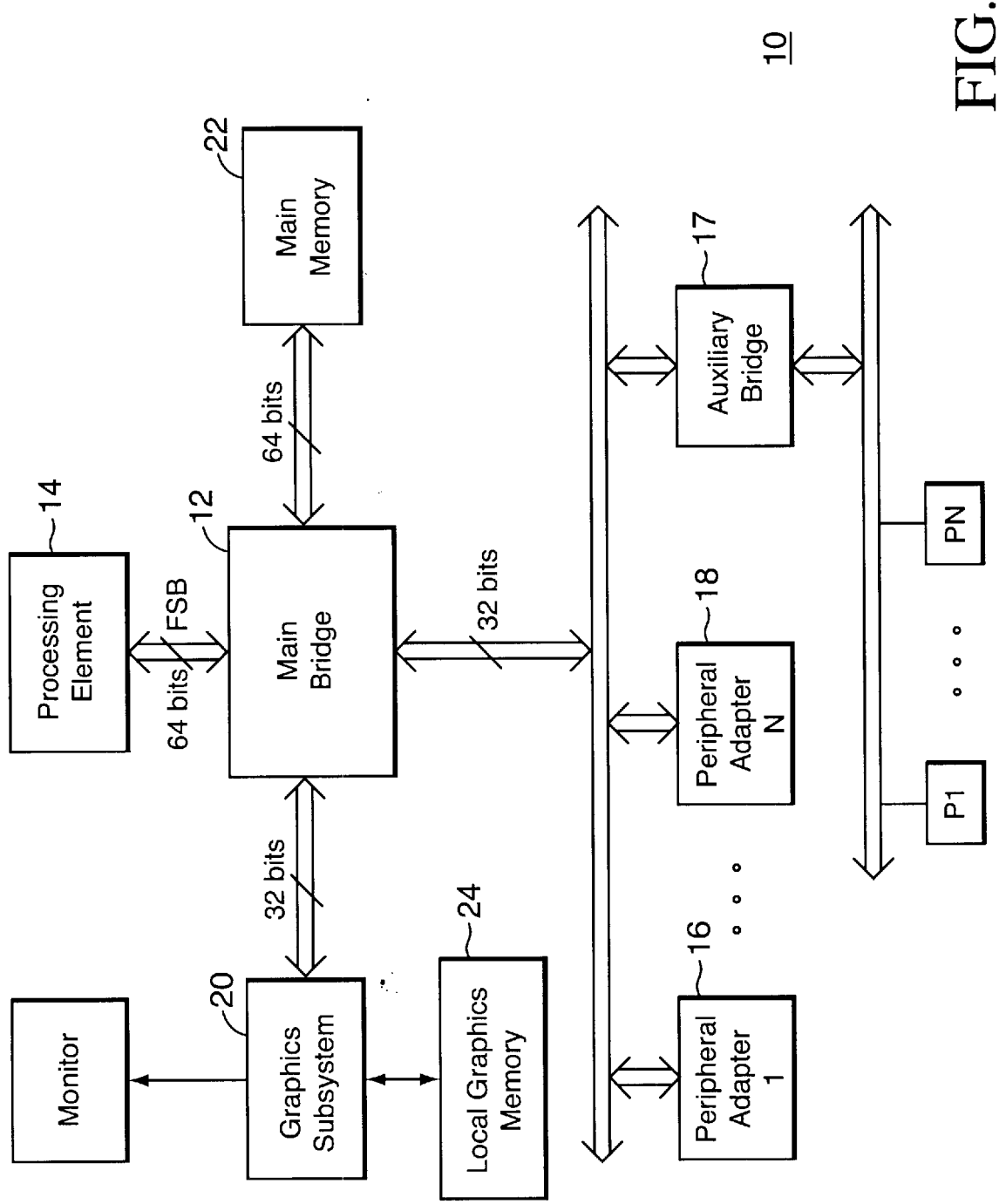
FIG. 1 shows the architecture of current hardware computing system platforms which include a main bridge device.
Figure 2:
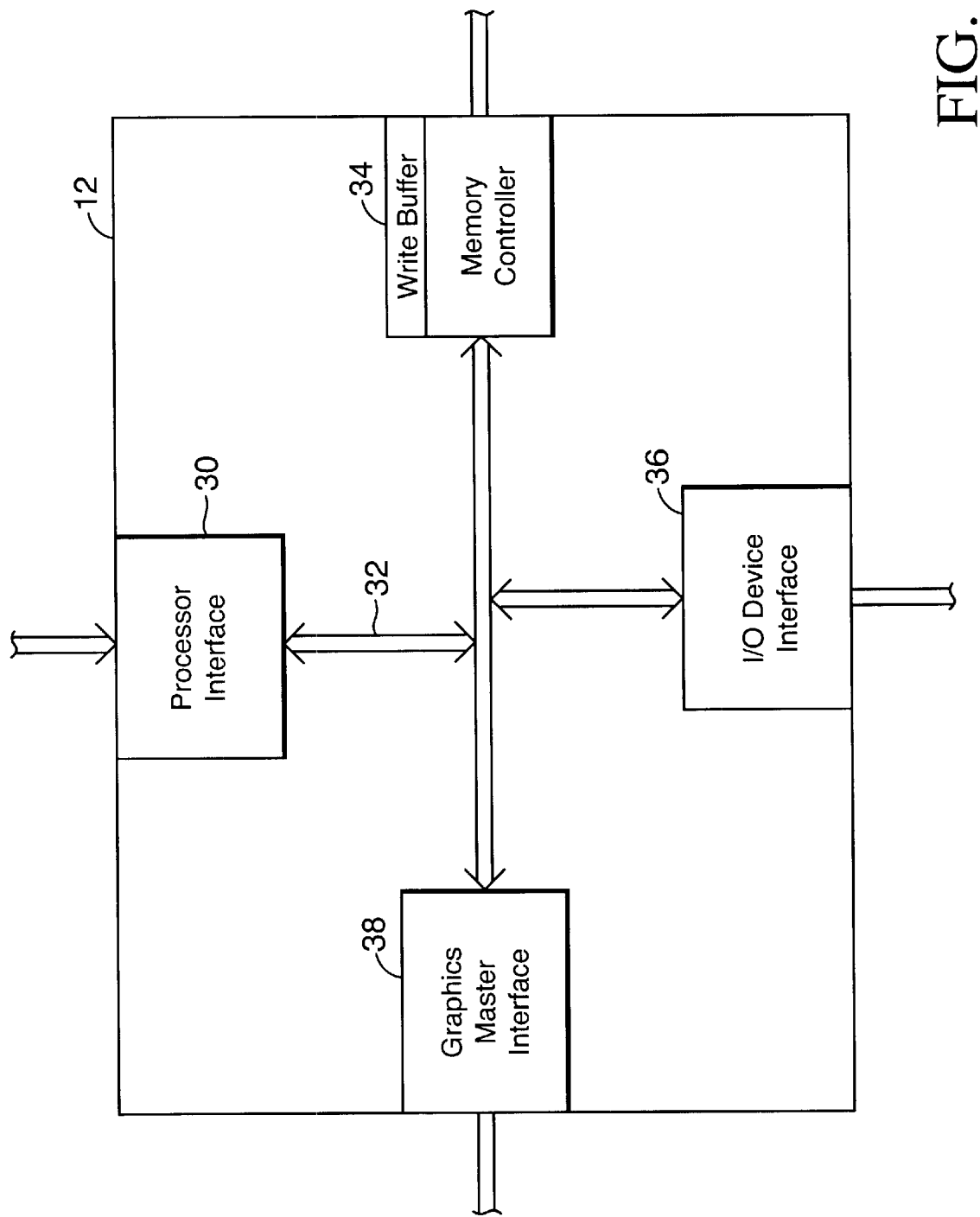
FIG. 2 shows the internal data path architecture of the main bridge.

FIG. 2 shows the internal data path architecture of the main bridge 12. The main bridge includes a processor interface 30 for connecting the processor bus to the internal bus 32 of the main bridge 12, a memory interface 34 for connecting the main memory to the internal bus 32, an I/O device interface (such as a PCI interface) 36 for connecting peripheral adapters to the internal bus 32 and a graphics interface 38 (such as AGP) for connecting the graphics subsystem to the internal bus 32. Traffic flows within the main bridge are complex. Typically, data travels between either the processor interface, the I/O device interface or the graphics interface and main memory. The internal bus 32 of the main switch is typically 128 bits wide but the actual width of the bus is not essential to the present invention.

Figure 3:
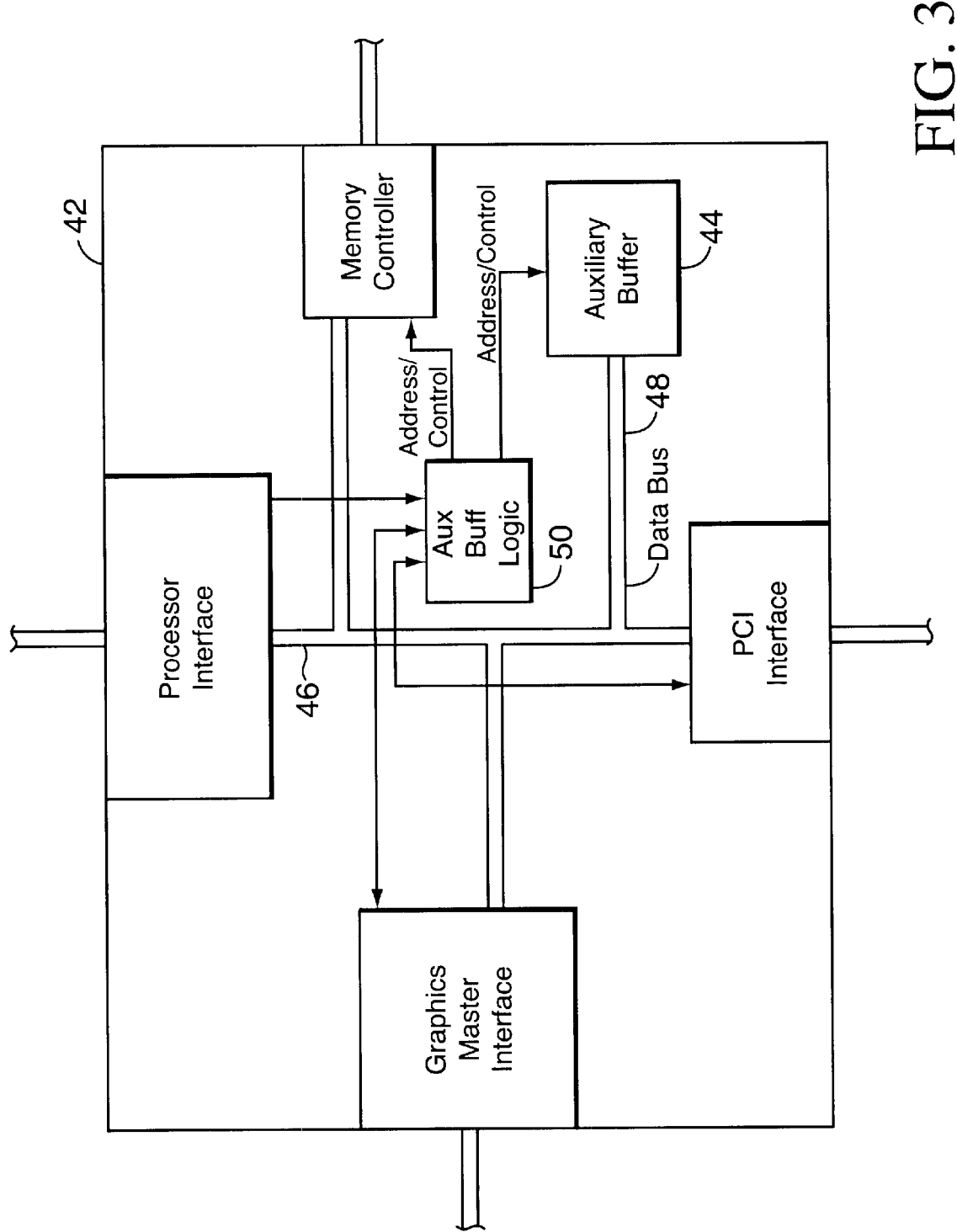
FIG. 3 shows internal data path architecture of the main bridge in accordance with the present invention.

FIG. 3 shows the architecture of the main bridge 42 in accordance with the present invention. In FIG. 3, an auxiliary buffer 44 has been added to the main bridge and the data paths 46 are altered to permit the processing element, the graphics subsystem and the bus adapters to have access to the auxiliary buffer 44. The auxiliary buffer 44 has a data bus 48 whose width preferably matches the width of the internal bus in the main bridge. However, the auxiliary buffer may have other widths and employ packing and unpacking logic to match the width of the internal bus without departing from the spirit and scope of the present invention. The auxiliary buffer data bus connects to the internal data bus of the main bridge which permits certain data to be stored in the main bridge rather than in the main memory as will be described below. Auxiliary buffer logic circuitry block 50 is added to receive address information from the various interfaces so that data may be captured by the auxiliary buffer or sent to the main memory. Devices connected to the main bridge are not affected by the addition of the auxiliary buffer 44 and auxiliary buffer logic circuitry 50.

Figure 4:
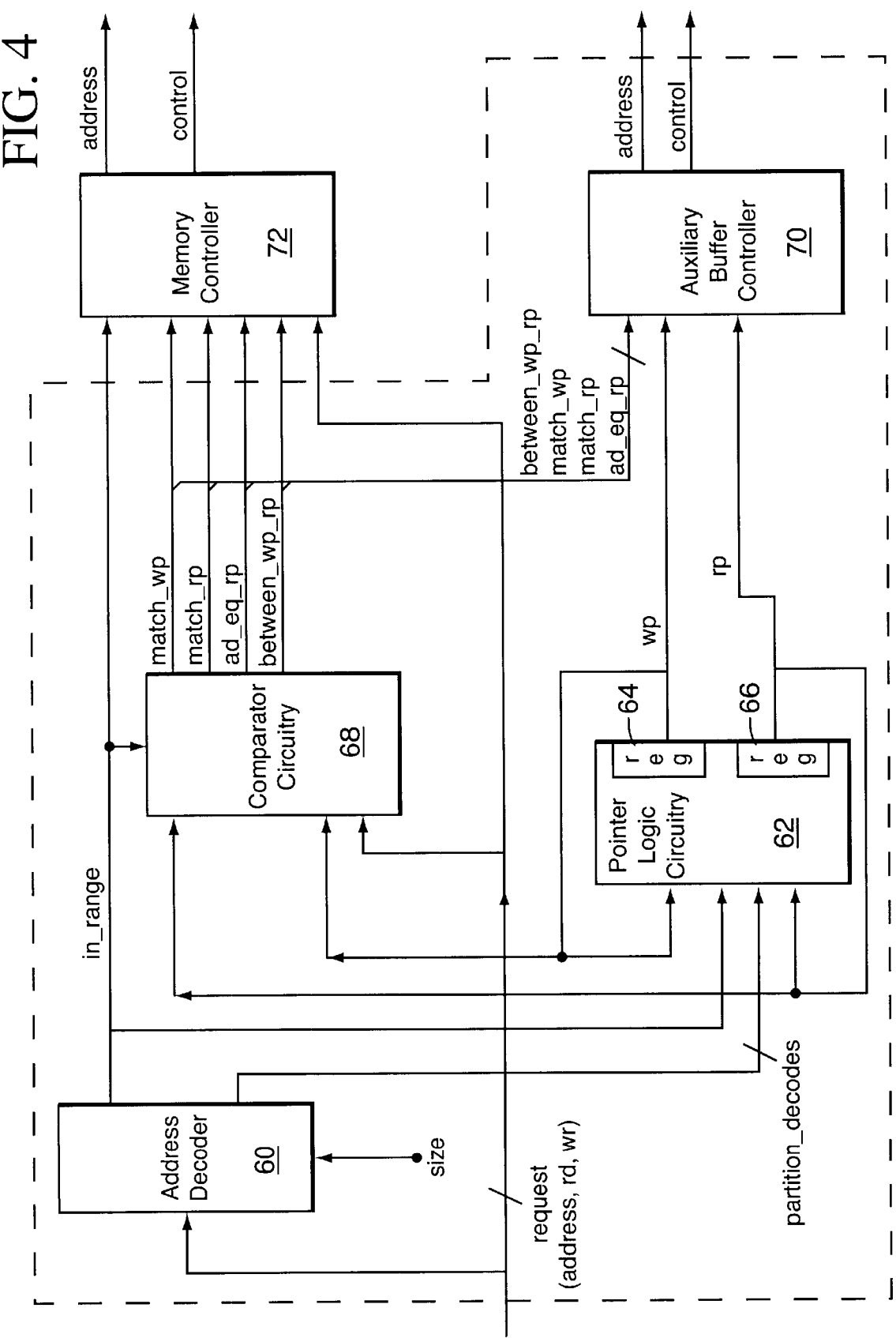
FIG. 4 shows an embodiment of auxiliary buffer logic circuitry.

FIG. 4 shows an embodiment of auxiliary buffer logic circuitry 50. The circuitry includes (i) an address decoder 60 which receives the address contained in the request and indicates, via an in_range signal, whether a request is within a predetermined range, (ii) pointer logic circuitry 62 that includes a write pointer register 64 and a read pointer register 66 and logic (not shown) for updating the pointers in response to the decoder output and the request, (iii) comparison circuitry 68 for comparing the request against the pointers to determine if there is a match and for comparing the pointers with each other to determine if they are equal to each other, and (iv) an auxiliary buffer controller 70 for performing read and write operations on the auxiliary buffer 44 using the read pointer register 66 or write pointer register 64. The auxiliary buffer 44 has a data bus that connects to the main bridge internal bus as described above and address and control signals that connect to an auxiliary buffer controller 70.

The address decoder 60 determines whether the request is within a prescribed range of addresses. The address decoder uses either standard combinational logic, comparators or other equivalent circuitry to make this determination. The address decoder receives a size input to determine the size of the prescribed range and, in the case where multiple partitions are used, decodes partition boundary signals for the pointer logic circuitry.

The pointer logic circuitry 62 updates the pointers by incrementing the pointers in the case of a linear access pattern or by adding a constant to the pointers, in the case of a more complex pattern. The constant, in one version of the invention, is derived from a predetermined table of offsets. The addition function is performed by an adder, an alu or other equivalent circuitry. In the case of multiple partitions, the pointer logic circuitry includes a read pointer and a write pointer for each partition.

The comparison circuitry 68 employs comparators, an alu or other equivalent circuitry to compare the address of the request to the read and write pointers. An equality comparison to either the write pointer or read pointer causes the comparison circuitry to assert a match_wp or match_rp signal, respectively. If the read pointer and write pointer have the same value, the comparison circuitry asserts a ad_eq_rp signal. If after a write access the read pointer and the write pointer have the same value then some or all of the buffer should be flushed to main memory to guard against a possible overflow condition. If the address of the request is between the read pointer and the write pointer, the comparison circuitry asserts a between_wp_rp signal.

A memory controller 72 in FIG. 4 provides address and control signals to the main memory. It is activated to perform a memory cycle when the request is not within the prescribed range, when a flush of the auxiliary buffer to memory must occur or when the access must be directed to the main memory because the access is within the prescribed range but the address does not reside in the auxiliary buffer.

The auxiliary buffer controller provides address and control signals to the auxiliary buffer. It is activated to perform buffer cycles when the request matches one of the pointers or when there is a flush of the auxiliary buffer to main memory.

Figure 5:
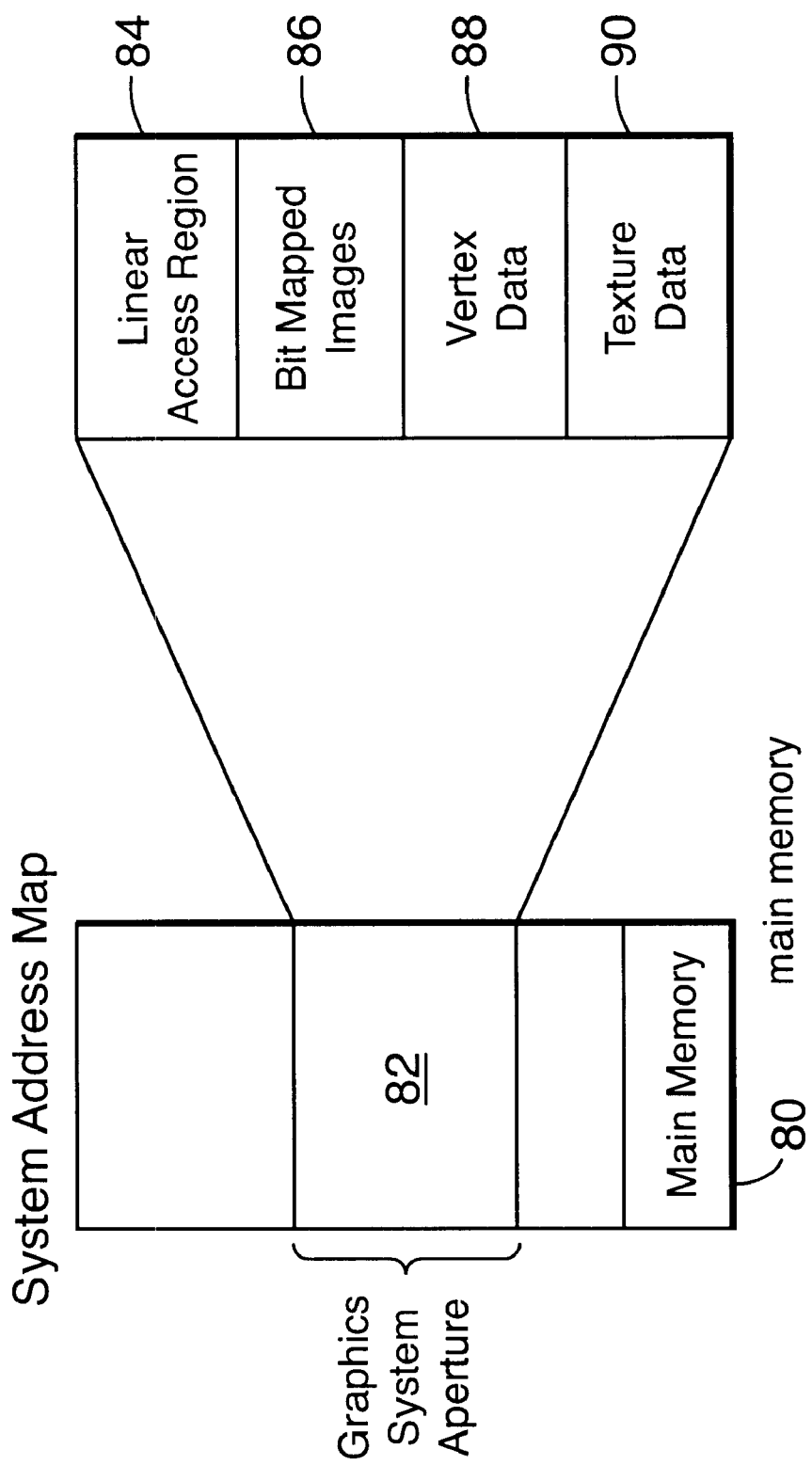
FIG. 5 show an example of how a graphics aperture is employed in current computer systems.

FIG. 5 show an example of how a graphics aperture in address space 80 of main memory is employed in current computer systems. In the current main bridge architecture, the graphics subsystem is assigned a range of address space for its use. This area of memory is called a graphics aperture 82 and is typically located above the top of the main memory, employing a facility in the main bridge (a relocation table) to map the aperture to actual pages in the main memory. A portion of that space is marked as a linear access region 84. The address decoder 60 of FIG. 4 decodes this region so that the auxiliary buffer is accessed when an access falls within this region. As an example, if the total address space is 2.0 Gigabytes, the aperture that is set aside may be 500 Megabytes for the graphics subsystem. Some of the region contains bit maps 86, vertex data 88 and texture data 90, but one special region is allocated as the linear access region 84.

Data for this linear access region has the desirable attributes that each location in the region is written once and read once and that the entire region is written linearly (or with a known access pattern) and read linearly (or with a known access pattern). For a graphics subsystem there are many kinds of data that have this access pattern, such as dynamic texture data, vertex data for 3D graphics, bit mapped image data and large command lists for the graphics master. For a peripheral, such as a disk or network, stored or transferred images may have this access pattern. Even a peripheral such as an audio output device may have such an access pattern.

In any event, this linear access region in the address space is the region that is dedicated to being stored in the auxiliary buffer and the auxiliary buffer relies on data in this region having the attributes described above.

Figure 6:
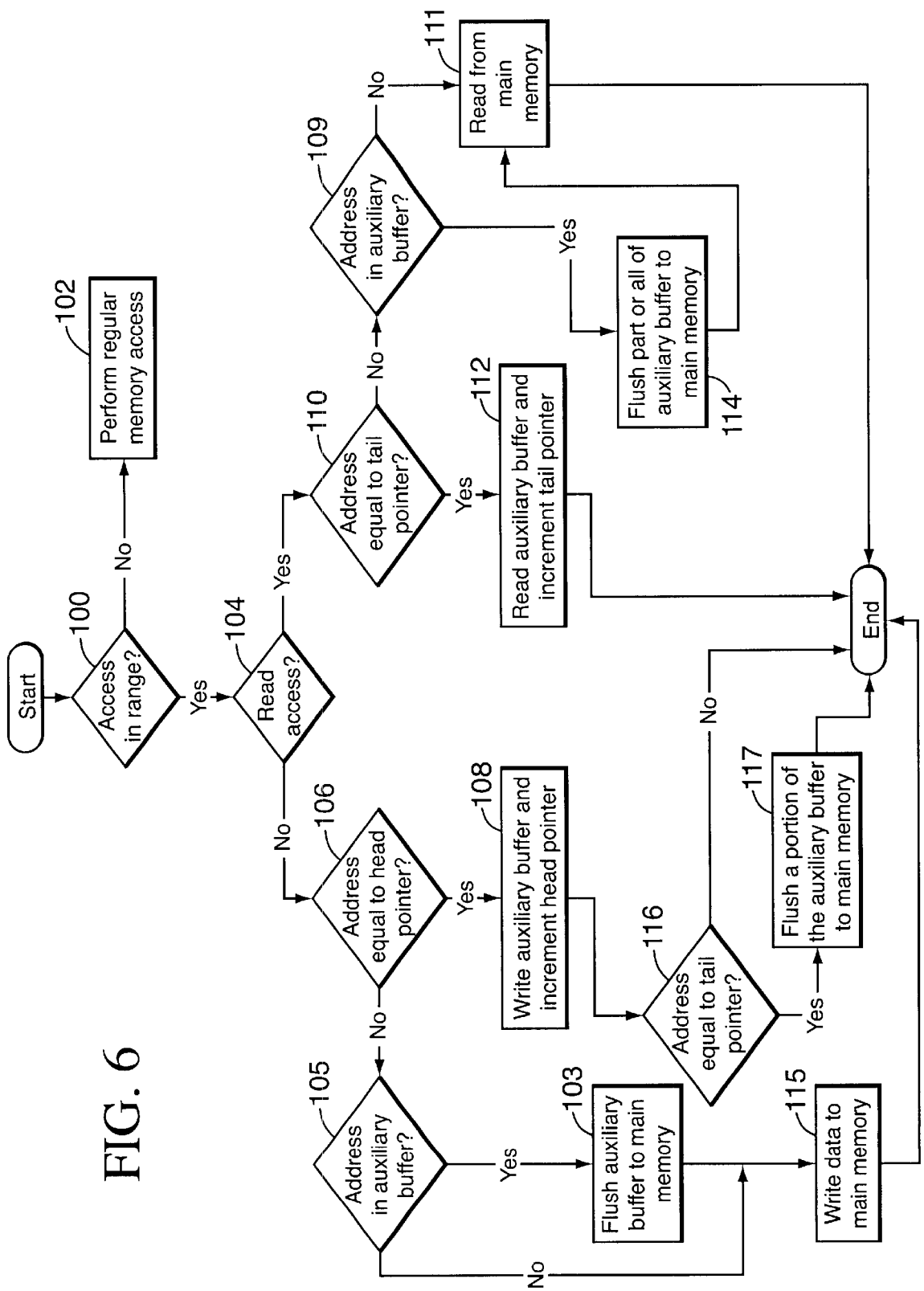
FIG. 6 shows a flow chart depicting the operation of the auxiliary buffer system in the modified main bridge in accordance with the present invention.

Operation of the auxiliary buffer system in the modified main bridge in accordance with the present invention is depicted in the flow chart of FIG. 6. A request to access the main memory is made and before the access is started, a test, in step 100, of the address for the access is made by the decoder 60 of FIG. 4 to determine whether the request is within the allocated range for linear accesses. If not, a regular memory access is performed in step 102. If the request is within the linear access region, as determined in step 100, then an in range signal is asserted, and another test is made, in step 104, in the comparison circuitry of FIG. 4 to determine whether the access is a read or a write.

Write Accesses

Assuming that the write access is within the allocated range, there are three cases to consider for write accesses based on whether or not the address of the request matches the head pointer and whether or not data at the address of the request resides in the auxiliary buffer.

Write Case 1: The address of the write matches the head (write) pointer, in step 106. The comparison circuitry 68 asserts a match wp signal, the auxiliary buffer 44 is written, in step 108, at the head pointer location by the auxiliary buffer controller 70 and the head pointer 64 is then incremented by the pointer logic circuitry 62 of FIG. 4 by an amount equal to the size of the access. For example, if the access size is 8 bytes then the pointer is incremented to the next 8-byte location. Next, in step 116, the comparison circuitry 68 tests again to determine whether the. address is equal to the tail pointer in order to detect a possible impending overflow condition. If not, the flow ends. If the address is equal to the tail pointer, the comparison circuitry asserts the ad_eq_rp signal, indicating that the buffer is full and, in step 117, a portion of the auxiliary buffer is flushed to the main memory to prevent an overflow and the flow ends. The entire buffer need not be flushed, only enough of the buffer to make room for new write data. The amount that is flushed can be optimized based on system considerations.

Write Case 2: The address of the write does not match the head (write) pointer and the address of the request resides in the auxiliary buffer. This is the case of an access that does not meet the prescribed access pattern. Step 105 determines whether the address of the request resides in the auxiliary buffer, that is, whether the address is between the read and write pointers. If so, then the data in the auxiliary buffer is flushed to the main memory in step 103 via the auxiliary buffer controller 70 and the main memory controller 72 and the tail pointer 66 is made equal to the head pointer 64 by the pointer logic circuitry 62. In step 115, the write data associated with the request is written to the main memory.

Write Case 3: The address of the write does not match the head (write) pointer and the address of the request does not reside in the auxiliary buffer. In this case, the write data associated with the request is written to main memory, in step 115, and the flow ends.

Read Accesses

Assuming that the read access is within the allocated range, there are three cases to consider for read accesses based on whether the address of the request matches the tail pointer and whether or not the data requested is in the auxiliary buffer.

Read Case 1: The address of the read matches the tail (read) pointer. In step 110, the comparison circuitry 68 asserts a match_rp signal, the auxiliary buffer 44 is read at the read pointer location via the auxiliary buffer controller 70 and the tail pointer 66 is then incremented by the pointer logic circuitry 62 by the size of the access, in step 112. If the tail pointer becomes equal to the head pointer then the auxiliary buffer is empty (this is the default state of the auxiliary buffer pointers).

Read Case 2: The address of the read does not match the tail pointer and the address in the request resides in the auxiliary buffer. Step 109 determines whether the address resides in the auxiliary buffer, that is, whether the address is between the read and write pointers. Because this request is a request that does not conform to the prescribed access pattern, some or all of the auxiliary buffer is flushed to main memory, in step 114, the portion of the buffer being flushed having an effect on the performance of the system. In a first alternative, the entire auxiliary buffer is flushed to main memory and the read request is then directed to main memory, in step 111. This alternative incurs a latency that depends on the time to flush the entire buffer. A second alternative is to flush the auxiliary buffer until the read address is equal to the read pointer. This alternative can reduce the latency significantly, depending on how far the address of the read request is from the write pointer. For example, suppose the address of the read is half-way between the write pointer and the read pointer. Then, only the locations from the read pointer to the read address are flushed to main memory. This is half the number of locations that would have been flushed in the first alternative. Also, in the second alternative, the read request can be directed to the auxiliary buffer instead of main memory, by proceeding from step 114 to step 112 instead of step 111.

Read Case 3: The address of the read does not match the tail pointer and the data requested does not reside in the auxiliary buffer, as determined in step 109. The requested data is read from main memory in step 111 and the flow ends.

Figure 7:
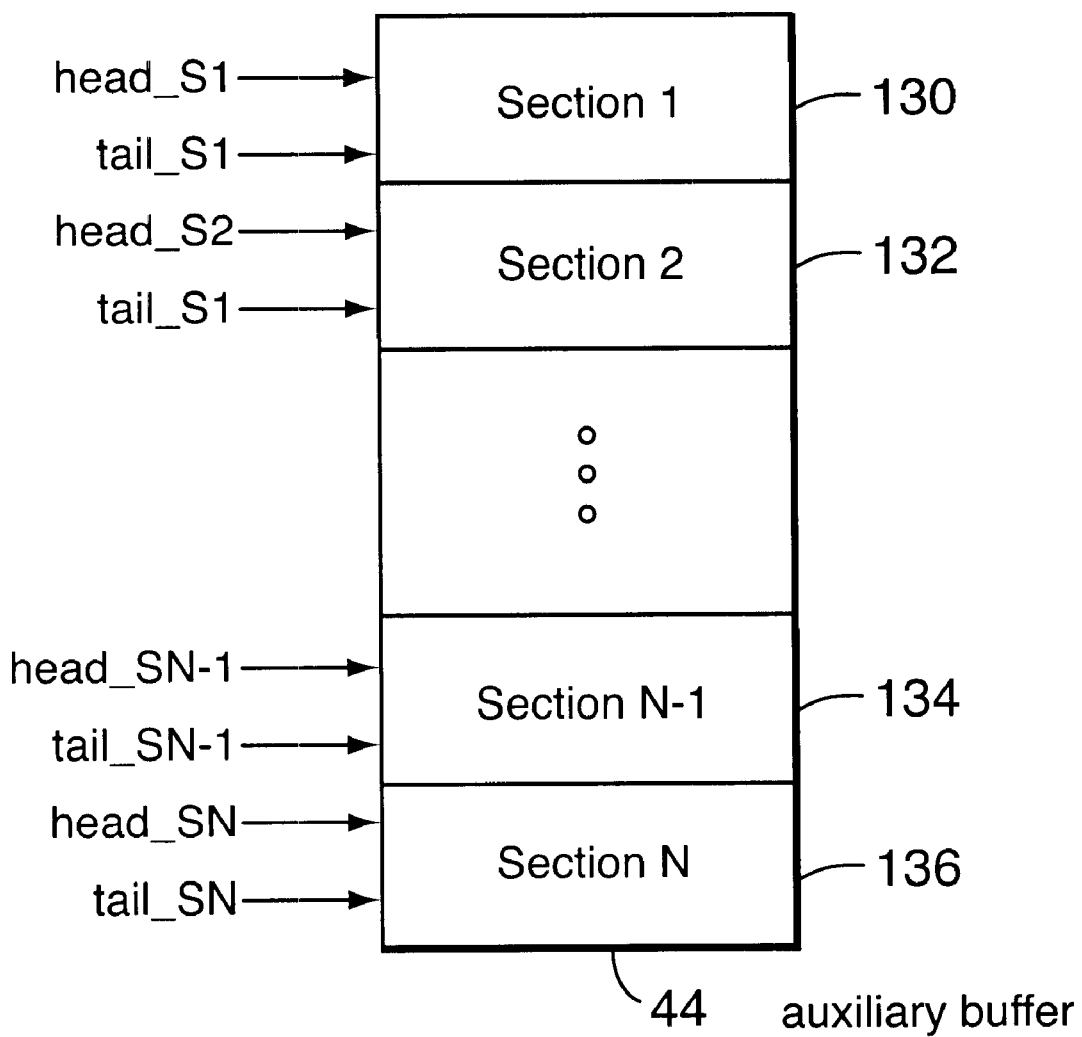
FIG. 7 shows an alternative embodiment in which the auxiliary buffer is partitioned into a number of fixed sized sections.

FIG. 7 shows an alternative embodiment in accordance with the present invention in which the auxiliary buffer 44 is partitioned into a number of fixed sized sections 130–136. Each of the sections has its own head pointer and tail pointer and associated logic as described above for managing the section. In the figure, one section is dedicated to a peripheral such as a disk, and another is dedicated to audio while the rest of the buffer is dedicated to the graphics subsystem. The buffer is preferably partitioned on binary address boundaries to keep the logic simple, and because the pointer logic and address decoder determine the size of the partition, the partition, in one version of the invention is dynamic, meaning that the size of the partition is alterable during the operation of the computing system, depending on the needs of the system.

In yet another embodiment, the auxiliary buffer for a particular peripheral or graphics device is speculatively filled from the main memory based on the previous access patterns of the peripheral or graphics device.

In still yet another embodiment, the access pattern for the set aside region within the graphical aperture is not linear, but conforms to a different but known pattern. In this case the pointer logic circuitry alters the current pointer, instead of incrementing the pointer, according to the non-linear access pattern after an access occurs. Therefore, instead of employing pointers, other logic is used such as an adder that adds a fixed offset. Alternatively, a lookup table or map, which is accessed linearly, is used to determine the offset. In this case, the address to the table is incremented and the offset is looked up and added to the read or write pointer to determine the next pointer at which a read or write is expected to occur.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of accessing a memory to which an auxiliary buffer, addressed by a read pointer and a write pointer, is connected, comprising:

receiving a memory request, the memory request having an address specifying a location in memory and a type being either a read or a write, a write request including write data;

determining that the memory request is within a predetermined range of addresses in the memory based on the address of the request; and if the request is a write request and the address in the write request matches the write pointer, writing the buffer with the write data at the location specified in the write pointer, and altering the write pointer after writing the buffer to point to the next location for writing in the buffer; and if the request is a read request and the address in the read request matches the read pointer, reading the buffer from the location specified in the read pointer, and altering the read pointer after reading the buffer to point to the next location for reading the buffer.

2. A method of accessing a memory as recited in claim 1, wherein, when the auxiliary buffer is empty, the read pointer is equal to the write pointer.

3. A method of accessing a memory as recited in claim 1, further comprising: after altering the write pointer, determining whether the address of the request equals the read pointer; and if the address of the request equals the read pointer, flushing some or all of the auxiliary buffer to memory.

4. A method of accessing a memory as recited in claim 1, further comprising, after the determining step, if the request is a write request, the address in the write request does not match the write pointer, and the address is between the write pointer and the read pointer, flushing some or all of the auxiliary buffer to main memory; and writing the data in the write request to memory.

5. A method of accessing a memory as recited in claim 1, further comprising, after the determining step, if the request is a write request, the address in the write request does not match the write pointer, and the address is not between the write pointer and the read pointer, writing the data in the write request to memory.

6. A method of accessing a memory as recited in claim 1, further comprising, after the determining step, if the request is a read request, the address in the read request does not match the read pointer, and the address is between the write pointer and read pointer, flushing some or all of the auxiliary buffer to main memory; and reading the requested data from memory.

7. A method of accessing a memory as recited in claim 1, further comprising, after the determining step, if the request is a read request, the address in the read request does not match the read pointer, and the address is not between the write pointer and read pointer, reading the requested data from memory.

8. A method of accessing a memory to which an auxiliary buffer, addressed by a read pointer and a write pointer, is connected, comprising:

receiving a memory request, the memory request having an address specifying a location in memory and a type being either a read or a write, a write request including write data;

determining whether the memory request is within a predetermined range of addresses in the memory based on the address of the request;

if the request is not within the predetermined range of addresses, performing a memory access based on the memory request;

if the request is within the predetermined range of addresses:

if the request is a write request and the address in the write request matches the write pointer, writing the buffer with the write data at the location specified in the write pointer, and altering the write pointer after writing the buffer to point to the next location for writing in the buffer;

if the request is a read request and the address in the read request matches the read pointer and the buffer is not empty, reading the buffer from the location specified in the read pointer, and altering the read pointer after reading the buffer to point to the next location for reading the buffer;

if the request is a write request, the address in the write request does not match the write pointer, and the address is not between the write pointer and the read pointer, writing the data in the write request to memory;

if the request is a read request, the address in the read request does not match the read pointer, and the address is not between the write pointer and read pointer, reading the requested data from memory; and if the request is a write request, the address in the write request does not match the write pointer, and the address is between the write pointer and the read pointer, flushing some or all of the auxiliary buffer to main memory, and writing the data in the write request to memory; and if the request is a read request, the address in the read request does not match the read pointer, and the address is between the write pointer and read pointer, flushing some or all of the auxiliary buffer to main memory, and reading the requested data from memory.

9. A method of accessing a memory as recited in claim 8, further comprising: after altering the write pointer, determining whether the address equals the read pointer; and if the address equals the read pointer, flushing some or all of the auxiliary buffer to memory.

10. A buffering system for a memory that receives memory requests, the memory request having an address specifying a location in memory and a type being either a read or a write, a write request including write data, comprising:

a decoder for determining whether the memory request is within a predetermined range of addresses in the memory based on the address of the request and generating an in-range indicator;

comparison circuitry, responsive to the in-range indicator, for indicating when the address in the request matches either the read pointer or write pointer, for indicating when the address and the read pointer are equal, and for indicating when the address of a request is between the write pointer and read pointer;

auxiliary buffer controller means for performing read and write operations on the auxiliary buffer, including means, responsive to a write-pointer match or a read pointer match to the address, for writing the buffer with the write data at the location specified in the write pointer and for reading the buffer from the location specified in the read pointer, and means, responsive to an indication that the address of a request is between the write pointer and read pointer, and responsive to an indication that the address equals the read pointer after a buffer write operation, for making available some or all of the contents of the auxiliary buffer for writing to the memory;

pointer circuitry means, responsive to a write-pointer match to the address, for updating the write pointer after writing the buffer to point to the next location for writing in the buffer, and responsive to a read-pointer match to the address, for updating the read pointer after reading the buffer to point to the next location for reading the buffer; and an auxiliary buffer connected to the memory and to auxiliary buffer controller means, for holding write-once, read-once data.

11. A buffering system for a memory that receives memory requests as recited in claim 10, a memory controller for performing read and write operations on the memory, the memory controller, operative, in response to lack of an in-range request, to perform the memory request on the memory, operative, in response to an in-range request from the decoder and the address of the request being between the write pointer and read pointer, to write some or all of the contents of the buffer to memory and then to perform a memory access based on the request, and operative, in response to an in-range write request from the decoder, the address of the request not matching the write pointer, and the address not being between the write pointer or read pointer, to write the write data to the memory, operative, in response to an in-range read request from the decoder, the address of the request not matching the read pointer, and the address not being between the write pointer or read pointer, to read the requested data from the memory, and operative, in response to a match between the address and the read pointer after a buffer write is performed, to write some or all of the contents of the buffer to memory.

12. A buffering system for a memory that receives memory requests as recited in claim 10, wherein the pointer circuitry updates the read pointer or write pointer by incrementing the read pointer or write pointer.

13. A buffering system for a memory that receives memory requests as recited in claim 10, wherein the pointer circuitry updates the read pointer or write pointer by adding a fixed offset to the read pointer or write pointer.

14. A buffering system for a memory that receives memory requests as recited in claim 10, wherein the pointer circuitry includes a lookup table having a plurality of locations programmed with predetermined offsets; and wherein the pointer circuitry updates the read pointer or write pointer by selecting a location in the lookup table, reading a predetermined read or write pointer offset from the table and adding the offset to either the read or write pointer.

15. A buffering system for a memory that receives memory requests as recited in claim 10, wherein the auxiliary buffer is partitioned into a plurality of sections, each section having a specified size and boundary location; and wherein the pointer circuitry includes a read pointer and a write pointer for each section.

16. A buffering system for a memory that receives memory requests as recited in claim 15, wherein the decoder generates signals to indicate a section boundary location within the auxiliary buffer; and wherein at least one of the sections has a boundary location that is alterable.

\* \* \* \* \*